United States Patent
Huo et al.

(10) Patent No.: US 9,672,600 B2
(45) Date of Patent: Jun. 6, 2017

(54) CLAVICLE SUPPRESSION IN RADIOGRAPHIC IMAGES

(71) Applicant: Carestream Health, Inc., Rochester, NY (US)

(72) Inventors: Zhimin Huo, Pittsford, NY (US); Hui Zhao, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 89 days.

(21) Appl. No.: 14/082,464

(22) Filed: Nov. 18, 2013

(65) Prior Publication Data

US 2014/0140603 A1    May 22, 2014

Related U.S. Application Data

(60) Provisional application No. 61/727,769, filed on Nov. 19, 2012.

(51) Int. Cl.
| | |
|---|---|
| *G06K 9/00* | (2006.01) |
| *G06T 5/00* | (2006.01) |
| *G06T 5/20* | (2006.01) |
| *G06T 7/12* | (2017.01) |

(52) U.S. Cl.
CPC ............. *G06T 5/005* (2013.01); *G06T 5/20* (2013.01); *G06T 7/12* (2017.01); *G06T 2207/10116* (2013.01); *G06T 2207/20036* (2013.01); *G06T 2207/20081* (2013.01); *G06T 2207/20084* (2013.01); *G06T 2207/30008* (2013.01); *G06T 2207/30061* (2013.01)

(58) Field of Classification Search
None
See application file for complete search history.

(56) References Cited

U.S. PATENT DOCUMENTS

| | | | | |
|---|---|---|---|---|
| 5,848,198 | A | * 12/1998 | Penn | ............................ 382/276 |
| 6,154,560 | A | * 11/2000 | Cothren | ................ G06T 7/0012 |
| | | | | 382/128 |
| 7,085,407 | B2 | 8/2006 | Ozaki | |
| 7,623,692 | B2 | 11/2009 | Schildkraut et al. | |

(Continued)

FOREIGN PATENT DOCUMENTS

| | | | | |
|---|---|---|---|---|
| JP | WO 2015157067 A1 | * 10/2015 | ........... | A61B 6/5211 |
| WO | WO 2011077334 A1 | * 6/2011 | | |

OTHER PUBLICATIONS

Simko et al. "Elimination of clavicle shadows to help automatic lung nodule detection on chest radiographs", ECIFMBE 2008, IFBME Proceedings 22, pp. 488-491.*

(Continued)

*Primary Examiner* — Vu Le
*Assistant Examiner* — Samah Beg

(57) ABSTRACT

A method for clavicle suppression in a chest x-ray image. The method identifies the lung fields in the x-ray image and detects at least one portion of a clavicle ridge that lies outside the lung fields. Edges of a clavicle on each side of the detected clavicle ridge are detected, edge detection extended for the clavicle edges into the lung fields, and the clavicle defined within the x-ray image according to the edge detection. The clavicle is suppressed within the x-ray image to generate a clavicle-suppressed x-ray image and the clavicle-suppressed x-ray image is displayed, stored, or transmitted.

15 Claims, 17 Drawing Sheets

(56) References Cited

U.S. PATENT DOCUMENTS

| | | | |
|---|---|---|---|
| 8,064,675 B2* | 11/2011 | Huo | 382/132 |
| 2002/0072665 A1* | 6/2002 | Ozaki | 600/408 |
| 2002/0106118 A1* | 8/2002 | Ozaki | 382/132 |
| 2003/0215120 A1* | 11/2003 | Uppaluri | A61B 6/482 382/128 |
| 2004/0114790 A1* | 6/2004 | Yamamoto et al. | 382/131 |
| 2005/0100208 A1* | 5/2005 | Suzuki et al. | 382/157 |
| 2007/0086640 A1* | 4/2007 | Luo | G06K 9/38 382/132 |
| 2008/0212853 A1* | 9/2008 | Lin et al. | 382/128 |
| 2008/0317322 A1* | 12/2008 | Acharyya | G06T 7/0012 382/132 |
| 2009/0060366 A1* | 3/2009 | Worrell et al. | 382/256 |
| 2009/0060372 A1 | 3/2009 | Maton et al. | |
| 2009/0214099 A1* | 8/2009 | Merlet | 382/132 |
| 2009/0290779 A1 | 11/2009 | Knapp et al. | |
| 2010/0092061 A1* | 4/2010 | Chen et al. | 382/132 |
| 2010/0272341 A1* | 10/2010 | Reeves et al. | 382/131 |
| 2010/0278405 A1* | 11/2010 | Kakadiaris et al. | 382/131 |
| 2012/0263366 A1* | 10/2012 | Huo | G06T 5/009 382/132 |
| 2013/0108135 A1* | 5/2013 | Huo et al. | 382/132 |
| 2014/0079309 A1* | 3/2014 | Huo et al. | 382/132 |
| 2014/0270450 A1* | 9/2014 | Grass et al. | 382/131 |
| 2014/0376798 A1* | 12/2014 | La Pietra et al. | 382/132 |

OTHER PUBLICATIONS

D. Barthel et al. "Robust automatic lung field segmentation on digital chest radiographs", Int J CARS 2009, pp. S326-S327.*

Wechsler et al. "Automatic detection of rib contours in chest radiographs", 1977, pp. 688-694.*

Park et al. "Detection and labeling ribs on expiration chest radiographs", SPIE 2003, pp. 1021-1031.*

Suzuki et al., "Image-Processing Technique for Suppressing Ribs in chest Radiographs by Means of Massive Training Artificial Neural Network (MTANN)," IEEE Transactions on Medical Imaging, vol. 25, No. 4, Apr. 2006, pp. 406-416.

Vogelsang et al., "Detection and compensation of Rib Structures in Chest Radiographs for Diagnose Assistance," Proceedings of SPIE, vol. 3338, Feb 1998, pp. 774-785.

Vogelsang et al., "Model based analysis of chest radiographs," Proceedings of SPIR, vol. 3979, 2000, pp. 1040-1052.

Loog et al., "Filter learning: Application to suppression of bony structures from chest radiographs," Medical Image Analysis, 10 (2006), pp. 826-840.

* cited by examiner

18

14

44

42

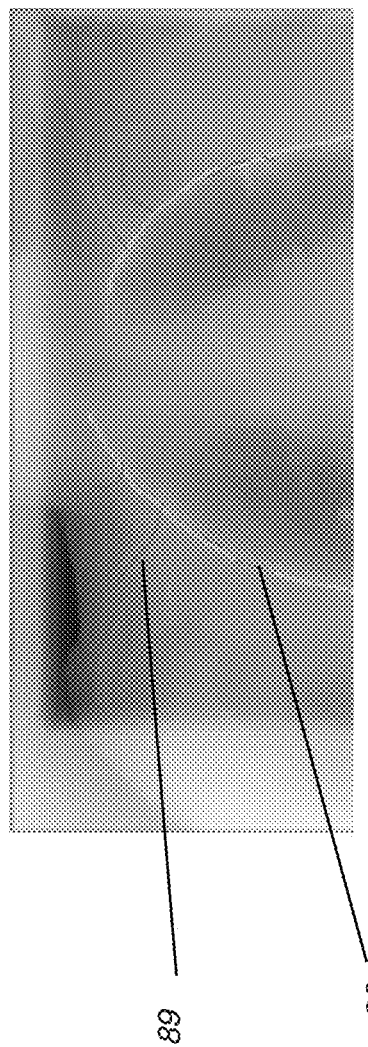
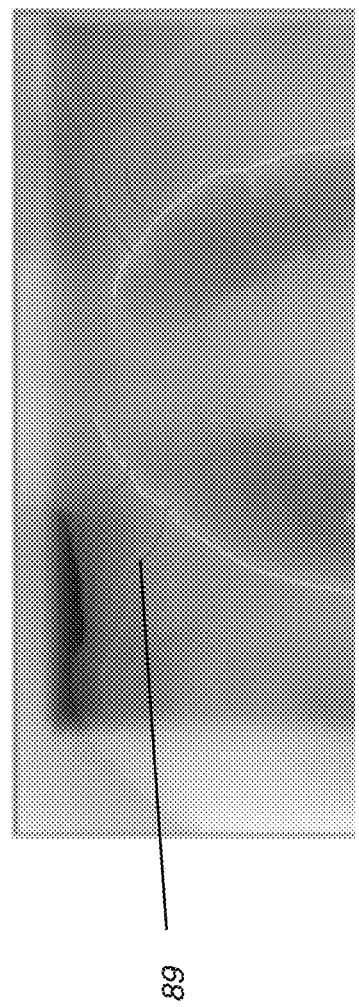

CLAVICLE SUPPRESSION IN RADIOGRAPHIC IMAGES

CROSS REFERENCE TO RELATED APPLICATIONS

Priority is claimed from U.S. Provisional Patent Application No. 61/727,769 filed Nov. 19, 2012 entitled "CLAVICLE SUPPRESSION IN RADIOGRAPHIC IMAGES" in the names of Hui Zhao and Zhimin Huo and incorporated herein in its entirety.

FIELD OF THE INVENTION

The present invention relates generally to the field of radiographic imaging and more particularly to methods for detecting and suppressing clavicle image content in chest x-ray images.

BACKGROUND OF THE INVENTION

The chest x-ray is useful for detecting a number of patient conditions and for imaging a range of skeletal and organ structures. Radiographic images of the chest are useful for detection of lung nodules and other features that indicate lung cancer and other pathologic structures and other life-threatening conditions. In clinical applications such as in the Intensive Care Unit (ICU), chest x-rays can have particular value for indicating pneumothorax as well as for tube/line positioning, and other clinical conditions. To view the lung fields more clearly and allow more accurate analysis of a patient's condition, it is useful to accurately identify and suppress features of the chest x-ray, including the clavicle and the rib cage and related features, without losing detail of the lung tissue or of other features within the chest cavity.

Methods have been proposed for detecting and suppressing rib structures and allowing the radiologist to view the lung fields without perceptible obstruction by the ribs. Some methods have shown a measure of success using techniques for template matching, rib edge detection, or curve fitting edge detection. Even if rib structures are well-defined, however, it can be challenging to remove rib features from the chest x-ray image without degrading the underlying image content that can include lung tissue. Poor performance in detecting and suppressing the ribs translates to higher rates of false positives (FPs) in diagnosing the lung tissue and can cause the radiologist to misinterpret or overlook tissue features of interest.

Suppression of the clavicle presents a particular challenge for image processing and it can be more difficult to accurately identify the clavicle due to its particular structure and conventional chest x-ray imaging practices. In the x-ray image, the clavicle structure crosses the ribs and the intersection of the rib cage with the clavicle can readily confuse rib detection algorithms, leading to less than ideal rib segmentation and poor results in clavicle suppression.

US Patent Application Publication No. 2009/0290779 entitled "FEATURE-BASED NEURAL NETWORK REGRESSION FOR FEATURE SUPPRESSION" (Knapp) describes the use of a trained system or neural network for predicting the position and shape of rib components and subsequently subtracting the predicted rib components from the chest x-ray image.

US Patent Application Publication No. 2009/0060366 entitled "OBJECT SEGMENTATION IN IMAGES" (Worrell) describes techniques using detected rib edges to identify rib and clavicle structures.

"IMAGE-PROCESSING TECHNIQUE FOR SUPPRESSING RIBS IN CHEST RADIOGRAPHS BY MEANS OF MASSIVE TRAINING ARTIFICIAL NEURAL NETWORK (MTANN)" by Suzuki et al. in *IEEE Transactions on Medical Imaging*, Vol. 25 No. 4, April 2006 describes methods for detection of lung nodules and other features using learned results from a database to optimize rib suppression for individual patient images.

"DETECTION AND COMPENSATION OF RIB STRUCTURES IN CHEST RADIOGRAPHS FOR DIAGNOSE ASSISTANCE" in Proceedings of SPIE, 3338:774-785 (1998) by Vogelsang describes methods for compensating for rib structures in a radiographic image. Among techniques described in the Vogelsang et al. article are template matching and generation and selection from candidate parabolas for tracing rib edges.

"MODEL BASED ANALYSIS OF CHEST RADIOGRAPHS", in Proceedings of SPIE 3979, 1040 (2000), by Vogelsang describes Bezier curve matching to find rib edges in a chest radiograph for alignment of a model and subsequent rib shadow compensation.

While some of these methods may have achieved a level of success using rib edge detection to identify rib structures that can then be suppressed in the x-ray image, there is a need to accurately detect and suppress the clavicle. Robustness is also desirable Thus, there is a need for a method of clavicle suppression that accurately detects clavicles in chest x-ray images and suppresses the clavicle area in the image, meanwhile preserving the image content of underlying lung tissue.

SUMMARY OF THE INVENTION

At least one embodiment of the present invention is directed to clavicle suppression in chest x-ray images, while preserving other image content.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for processing a chest x-ray image, the method executed at least in part by a computer system and comprising: identifying the lung fields in the x-ray image; detecting at least one portion of a clavicle that lies outside the lung fields; detecting edges of a clavicle on each side of the detected clavicle portion; extending edge detection for the clavicle edges into the lung fields; defining the clavicle within the x-ray image according to the edge detection; suppressing the clavicle within the x-ray image to generate a clavicle-suppressed x-ray image; and displaying the clavicle-suppressed x-ray image.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 6A-6C show a sequence of intermediate stages in clavicle detection for an exemplary chest x-ray.

DETAILED DESCRIPTION OF THE INVENTION

Figure 1:
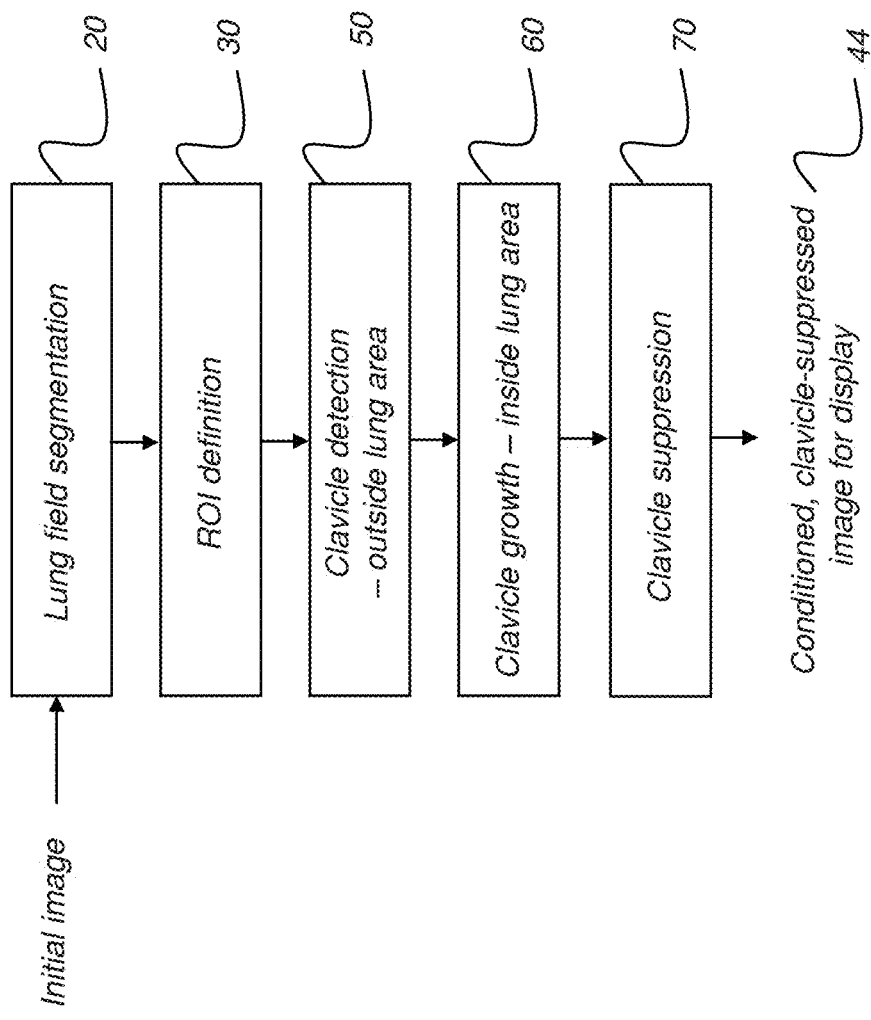
FIG. 1 is a logic flow diagram that shows steps of a procedure for clavicle suppression according to an embodiment of the present invention.

The following is a detailed description of the preferred embodiments of the invention, reference being made to the drawings in which the same reference numerals identify the same elements of structure in each of the several figures.

Reference is made to U.S. Provisional Patent Application No. 61/727,769 filed Nov. 19, 2012 entitled "CLAVICLE SUPPRESSION IN RADIOGRAPHIC IMAGES" in the names of Hui Zhao and Zhimin Huo and incorporated herein in its entirety.

In the context of the present disclosure, the term "segmentation" has the broad meaning that is generally understood by those skilled in the image processing arts. The act of segmenting the image partitions the image content in some way so that one or more sets of pixels are grouped according to the feature(s) they represent. Thus, for a chest x-ray for example, lung segmentation defines those portions of the image that represent lung tissue for a patient.

The logic flow diagram of FIG. 1 shows a sequence for automated clavicle suppression consistent with an embodiment of the present invention for chest x-ray image processing. The chest x-ray image can originate from a digital radiography (DR) detector or from scanned image data. This image data may also be obtained from an image archive, such as a PACS (picture archiving and communication system). The x-ray image that is input is optionally a processed image and is optionally scaled to reduced size for one or more of the processing steps that follow. In a lung field segmentation process 20, the lung and rib cage portions of the image are segmented, thus extracting the lung region of interest from the image. A number of approaches to lung segmentation have been proposed, including, for example, that described in U.S. Pat. No. 7,085,407 entitled "DETECTION OF RIBCAGE BOUNDARY FROM DIGITAL CHEST IMAGE" to Ozaki that employs landmark detection and other utilities to detect the boundaries of the rib cage. Other methods for lung detection and segmentation include methods that detect or estimate the spine structure and use a bounding box for coarse detection, with subsequent processing for more closely identifying the boundaries of the lung or rib cage. Neural network-based logic can also be employed for generating a pixel-based lung segmentation using techniques for trained system software. Boundary smoothing can also be employed, such as by using morphological filtering or other suitable processing technique, for example.

Continuing with the sequence of FIG. 1, with the lung region of interest or area including the lungs and rib cage identified, an ROI definition step 30 is executed. This step identifies the region of interest (ROI) and helps to limit subsequent processing for locating the clavicle to within an appropriate ROI along upper portions of the chest x-ray image that lie outside the lung fields.

Figure 2:
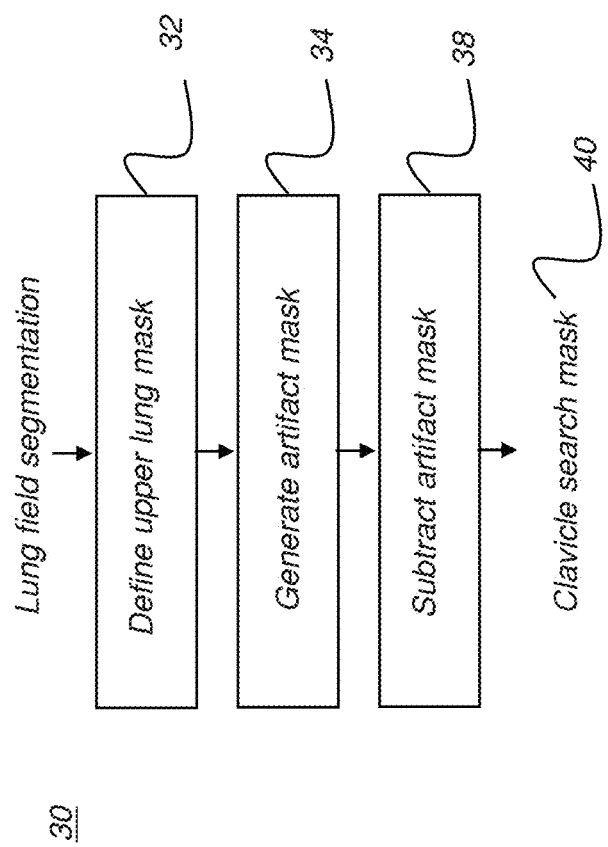
FIG. 2 is a logic flow diagram that shows steps for clavicle search mask generation.

The logic flow diagram of FIG. 2 shows sub-steps for ROI definition step 30 in more detail, consistent with an embodiment of the present disclosure. A define upper lung mask step 32 takes the lung segmentation information as input and generates an enlarged lung mask that exceeds the detected lung area by some amount, computed according to the detected width of the lung fields. A generate artifact mask step 34 then generates an artifact mask that includes any number of non-anatomical features that are likely to cause image artifacts, such as tubes, wires, and other objects. A subtraction step 38 then excludes the artifact mask from the enlarged lung mask in order to form a clavicle search mask 40.

Figure 3B:
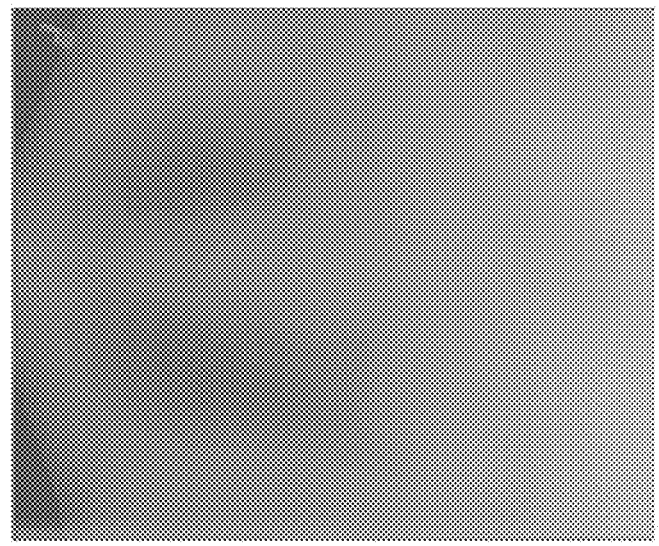
FIG. 3B shows a reduced-resolution chest x-ray image.
Figure 3A:
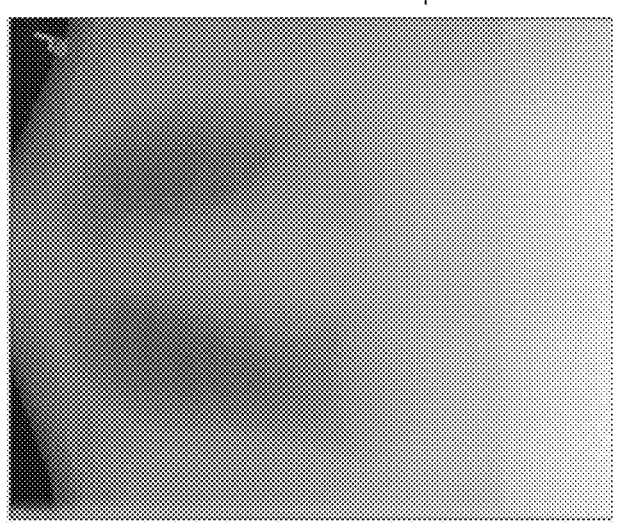
FIG. 3A shows a full-resolution chest x-ray image.
Figure 3D:
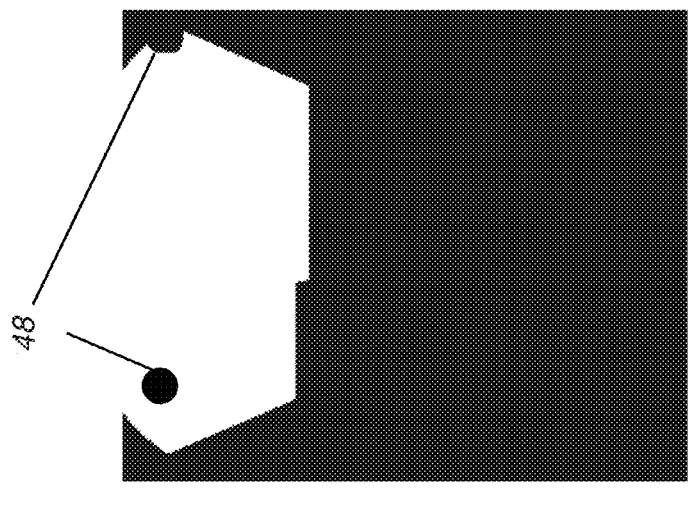
FIG. 3D shows a clavicle search mask for defining a region of interest for locating the clavicle.
Figure 3C:
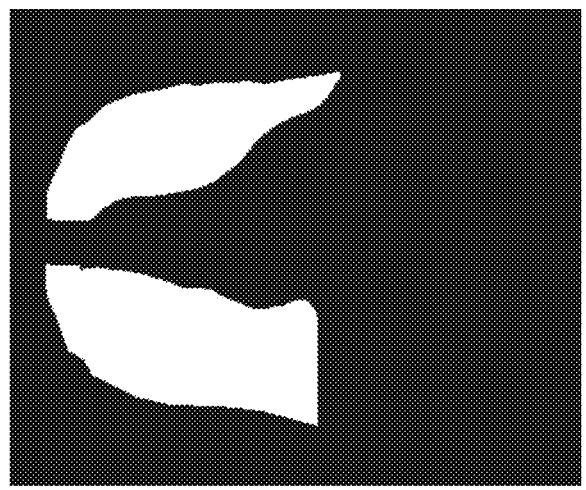
FIG. 3C shows a lung segmentation mask.
Figure 3E:
FIG. 3E shows an initial clavicle mask.
Figure 3G:
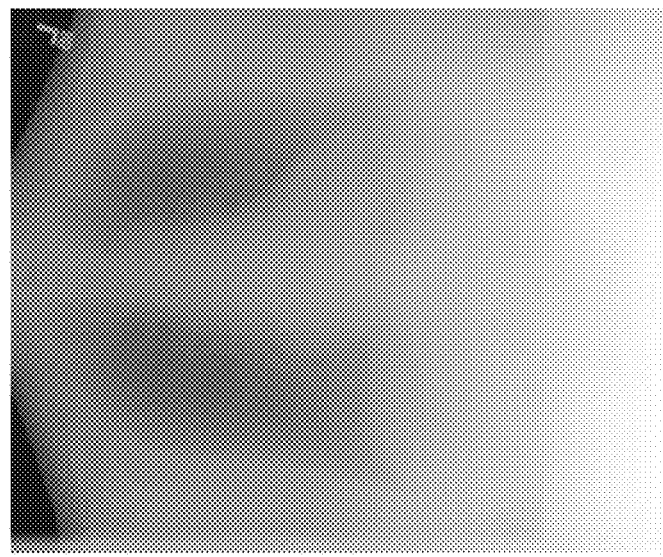
FIG. 3G shows a clavicle-suppressed image.
Figure 3F:
FIG. 3F shows a final clavicle mask.

By way of example for the sequence of FIGS. 1 and 2, FIG. 3A shows a full-sized chest x-ray image 14. FIG. 3B shows a reduced-resolution image 18. FIG. 3C shows a lung segmentation mask 16. FIG. 3D shows a clavicle search mask 22 including a number of artifact masks 48. FIG. 3E shows an initial clavicle mask 24. FIG. 3F shows a final clavicle mask 42. FIG. 3G shows an example of a clavicle-suppressed image 44 for processing.

Continuing with the sequence of FIG. 1, a clavicle detection step 50 is executed in order to detect the clavicle within the defined clavicle search mask 40 and outside the lung area. Growth step 60 and clavicle suppression step 70 for obtaining clavicle suppressed image 44 from the FIG. 1 sequence are described in more detail subsequently.

Figure 4:
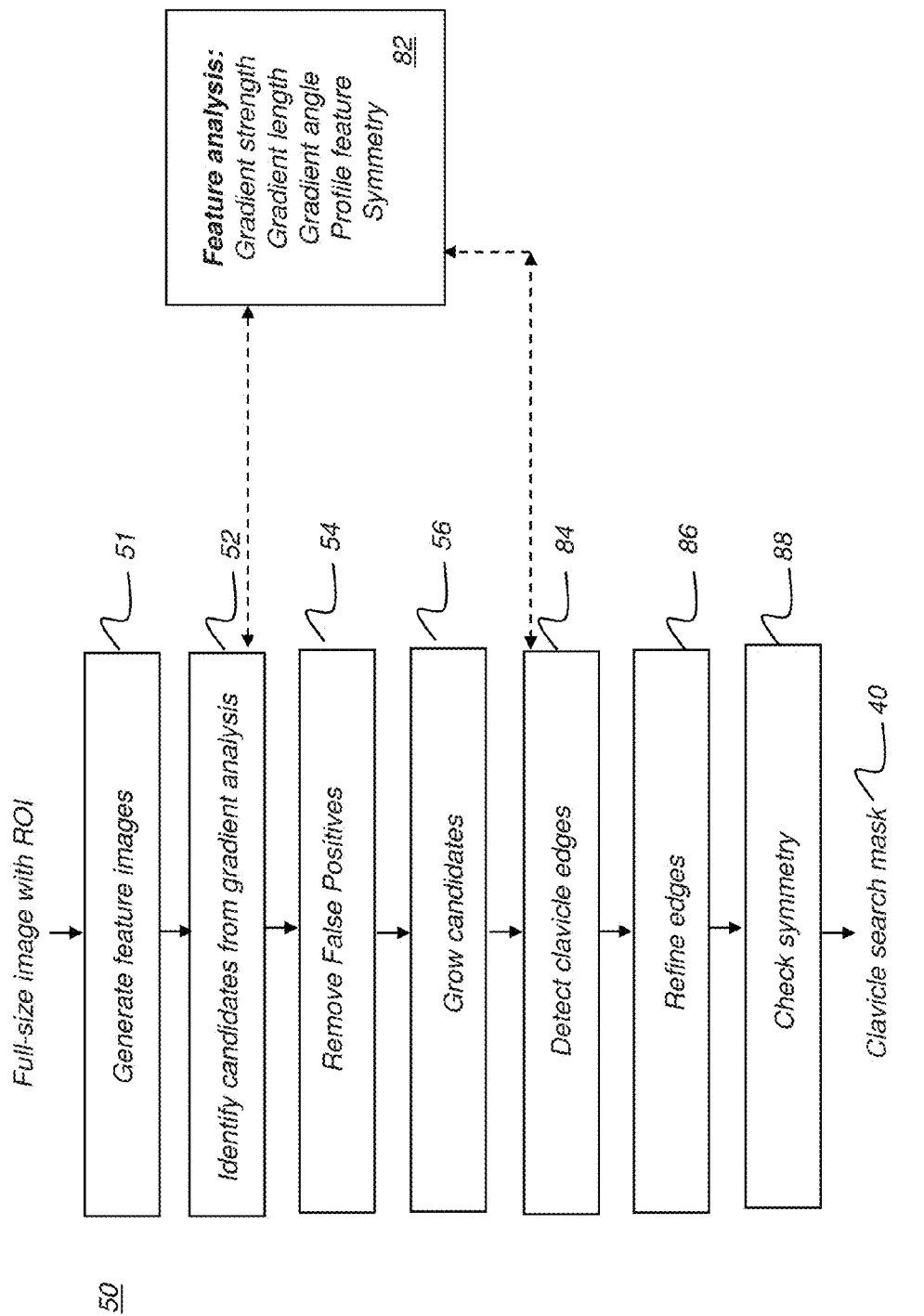
FIG. 4 is a logic flow diagram that shows sub-steps in a clavicle detection step consistent with an embodiment of the present invention.
Figure 5A:
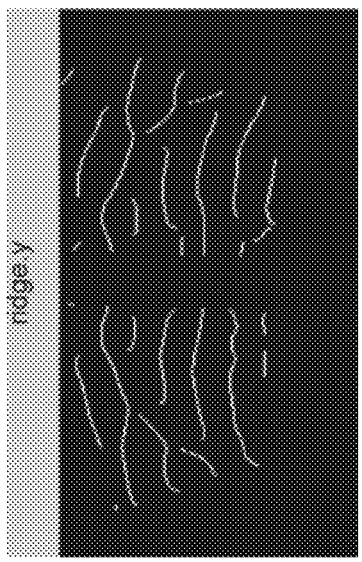
FIGS. 5A, 5B, 5C, and 5D are gradient feature images that show results of gradient analysis of an ROI of an exemplary chest x-ray image, each FIG. analyzing the gradient from a different angle.
Figure 5B:
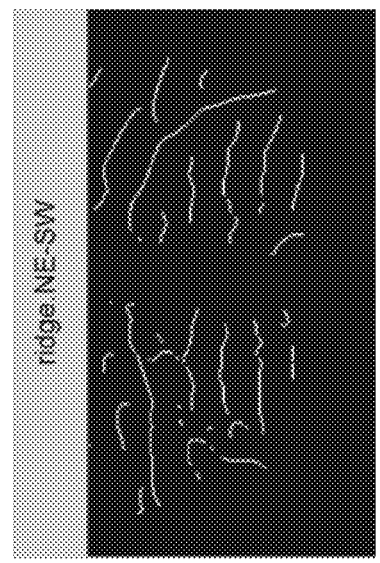
Figure 5C:
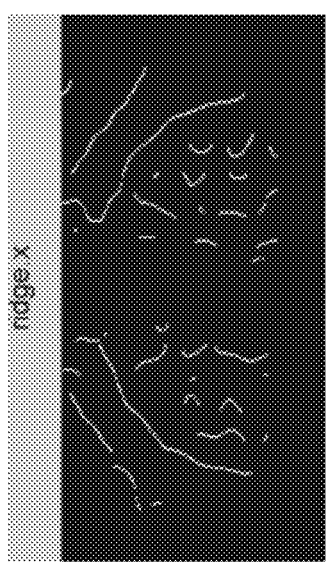
Figure 5D:
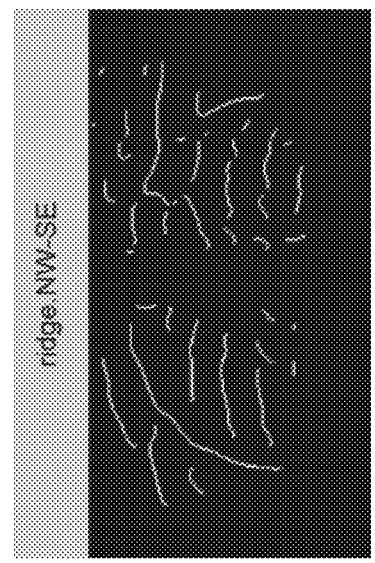

The logic flow diagram of FIG. 4 shows sub-steps in clavicle detection step 50 consistent with an embodiment of the present invention. The ROI is used to identify that portion of the full-sized image that is to be processed in step 50. A feature images generation step 51 generates one or more gradient feature images 77, such as those shown by way of example in FIGS. 5A, 5B, 5C, and 5D. A derivative analysis filter, such as a Sobel operator, Laplacian filter, or other filter for example, is applied to obtain images showing gradient features as in the examples of FIGS. 5A-5D. These gradient feature images are used as resources for clavicle detection. A gradient analysis step 52 is executed to detect a pattern of edges in the ROI that indicate a portion of the clavicle, such as the portion that lies outside or inside the lung field. As noted, FIGS. 5A, 5B, 5C, and 5D show gradient analysis of an ROI of an exemplary chest x-ray image. Each of FIGS. 5A, 5B, 5C, and 5D analyzes the gradient from a different angle. Gradient analysis identifies peak values for changes in image content that indicate edges of ribs and clavicles.

Figure 6C:
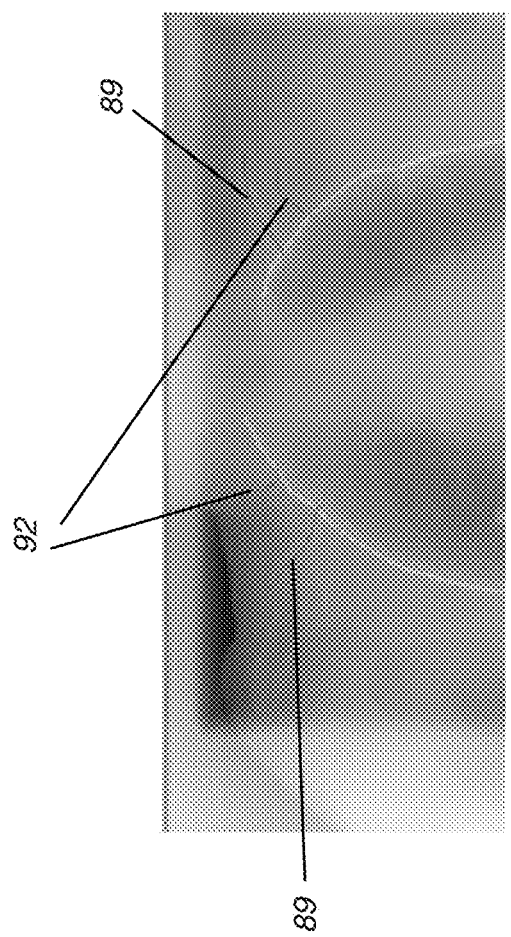

Continuing with the sequence of FIG. 4, once gradient analysis is complete, a set of candidates is identified from gradient analysis step 52. A set of feature analysis utilities 82 provide tools for candidate identification from the gradient analysis. Utilities 82 include tools for assessing gradient strength, length of the gradient feature, angle at which the gradient is obtained, intensity or gradient profile feature, and symmetry factors. A remove false positives step 54 then eliminates any of the candidates that do not meet criteria for symmetry and overall position relative to other identified structures. False positive removal can be based on any of a number of factors, including relative gradient strength, length of the candidate structure both inside and outside of the lung field, overall shape and profile, symmetry, and other features. By way of example, FIG. 6A shows an upper portion of a chest x-ray image with a clavicle ridge 89 that indicates the middle of the clavicle and a false positive feature 92 shown, prior to remove false positives step 54. FIG. 6B shows the same image following identification and removal of false positive feature 92. A grow candidates step 56 follows, in which the detected ridge 89 candidates are processed by a feature growing algorithm. Growth algorithms, familiar to those skilled in the image analysis arts, use local searching and optimization to extend the clavicle from any detected line segment, following rules that relate to edge direction, extension, and other characteristics of the clavicle. Given the extended ridge candidates, a clavicle edge detection step 84 then locates edges of the clavicles once false positives have been removed. Feature analysis utilities 82, as described in more detail previously, are also used for this function. A refine edges step 86 detects clavicle edges more accurately, based on previous processing. FIG. 6C shows an additional clavicle ridge 89 following edge refinement. A check symmetry step 88 then verifies a symmetrical pattern of clavicle edges according to estimates of spine location and modifies the final detections accordingly. A clavicle search mask 40 is generated as a result of this processing.

Growth step 60 (FIG. 1) extends clavicle ridge and edge detection to within the lung fields or rib cage area, using growth and edge refinement processing, applying rules and approaches for feature growth similar to those used in clavicle detection step 50. The clavicle search mask 40 generated in step 50 processing is used and refined in growth step 60.

Clavicle detection can utilize some amount of prior knowledge of rib and clavicle structures, such as shape, position, and general direction, and may apply some amount of morphological filtering. Among features that have been found to be particularly useful for clavicle identification include bone width and position, including percentage of pixels initially determined to be part of a rib feature. Structural information about clavicle features can be used in conjunction with image pixel intensities to separate likely clavicle content from other rib or non-rib image content.

Figure 7:
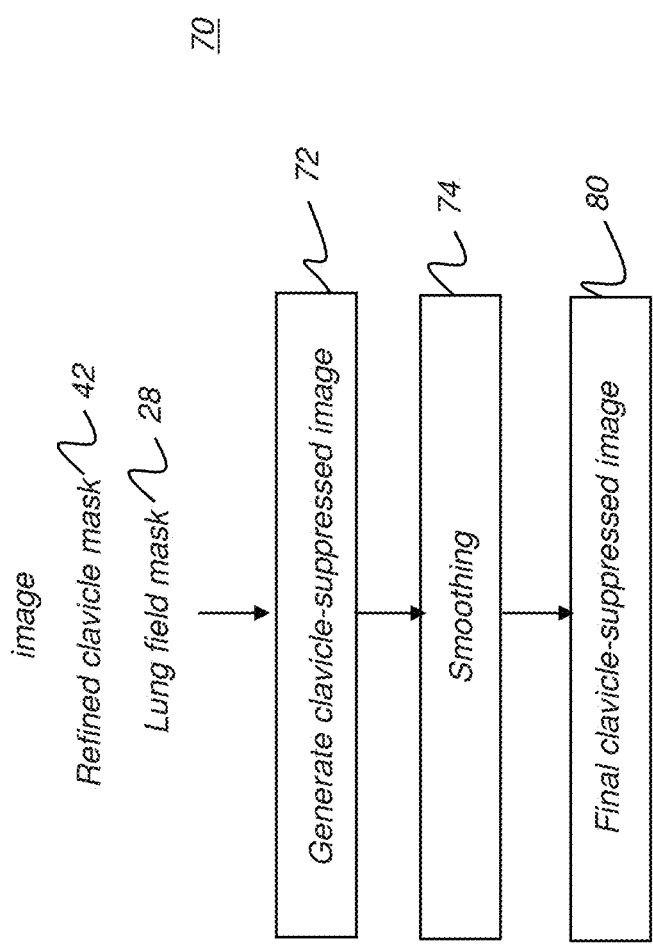
FIG. 7 is a logic flow diagram that shows the sequence of procedures used for clavicle suppression according to an embodiment of the present invention.
Figure 8:
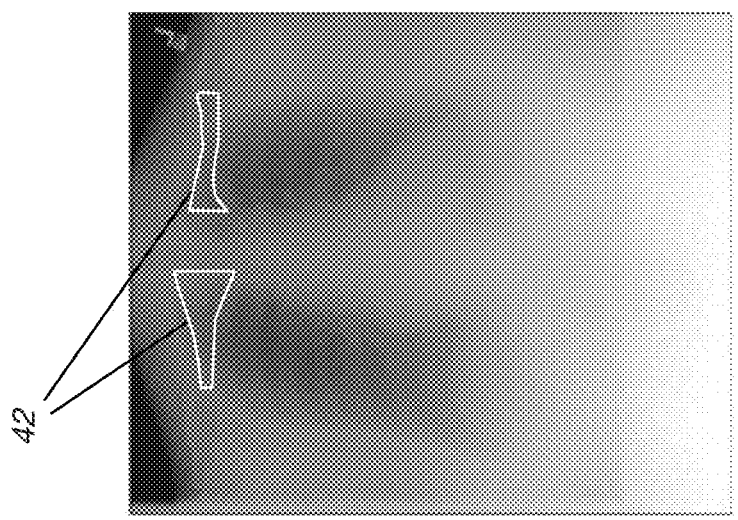
FIG. 8 shows a refined final clavicle mask superimposed on an example x-ray image.

The logic flow diagram of FIG. 7 shows the sequence of procedures used for clavicle suppression step 70. Inputs to this processing include the full-resolution or reduced-resolution image, a refined clavicle mask 42, and a lung field mask 28. FIG. 8 shows a refined final clavicle mask 42 superimposed on an example x-ray image. A generate clavicle-suppressed image step 72 performs an initial clavicle suppression process. An optional smoothing step 74 then further processes this initial image. A generate final clavicle-suppressed image step 80 is then executed to generate the final clavicle suppressed image for display. The processed final clavicle-suppressed image 44 (FIG. 1) can also be stored in an imaging database or provided as input for additional processing, such as for subsequent rib subtraction routines, for example.

Figure 9:
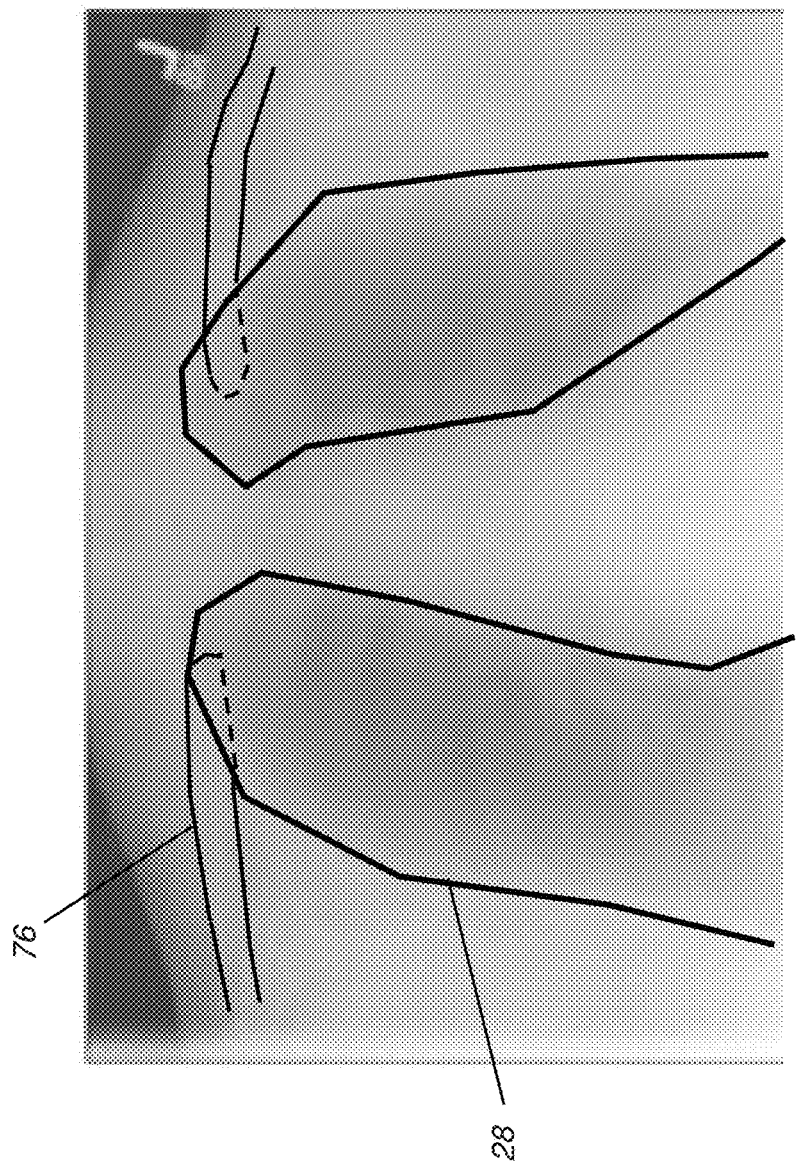
FIG. 9 shows relative positions of clavicles as shown by outlines, relative to the lung field mask.

FIG. 9 shows relative positions of clavicles as shown by outlines 76, relative to lung field mask 28 described previously. Embodiments of the present disclosure begin by first detecting outline 76 of the clavicle that lies outside of the lung field, as detected using lung field mask 28. Using growth algorithms following this initial detection allows clavicle detection in portions of the image that lie within the lung fields, as shown. Growth lines are indicated in dashed line format in FIG. 9. Edge-growing processing continues line segment processing to extend existing line segments and merging disconnected line segments as they are detected or extrapolated from existing segments. A growing algorithm is useful where segments of the clavicle are detected to be foreshortened or missing. As part of the growing algorithm, existing segments are aligned according to an anatomy model. Segments are iteratively extended and tested to determine whether or not growth is completed. Segment growth techniques are familiar to those skilled in the image analysis arts. Segment growth can also use edge extension techniques such as those employed for tubing detection and described in commonly assigned U.S. Pat. No. 8,064,675 entitled "Computer-Aided Tubing Detection" to Huo (incorporated by reference herein in its entirety) and rib detection as described in commonly assigned U.S. Ser. No. 13/527,629, filed on Jun. 20, 2012, entitled "Rib Suppression in Radiographic Images" to Huo (incorporated by reference herein in its entirety).

The basic sequence described with reference to FIGS. 1-9 can alternately be executed in a number of different ways. For example, the image can be initially processed to perform rib suppression prior to clavicle suppression.

According to an alternate embodiment of the present disclosure, clavicle detection utilizes a trained system, such as one that applies a neural network (NN) to the candidate identification problem that is addressed in gradient analysis step 52 (FIG. 4). A trained system can be used, for example, to classify pixels in the region of interest as clavicle or non-clavicle.

Figure 10:
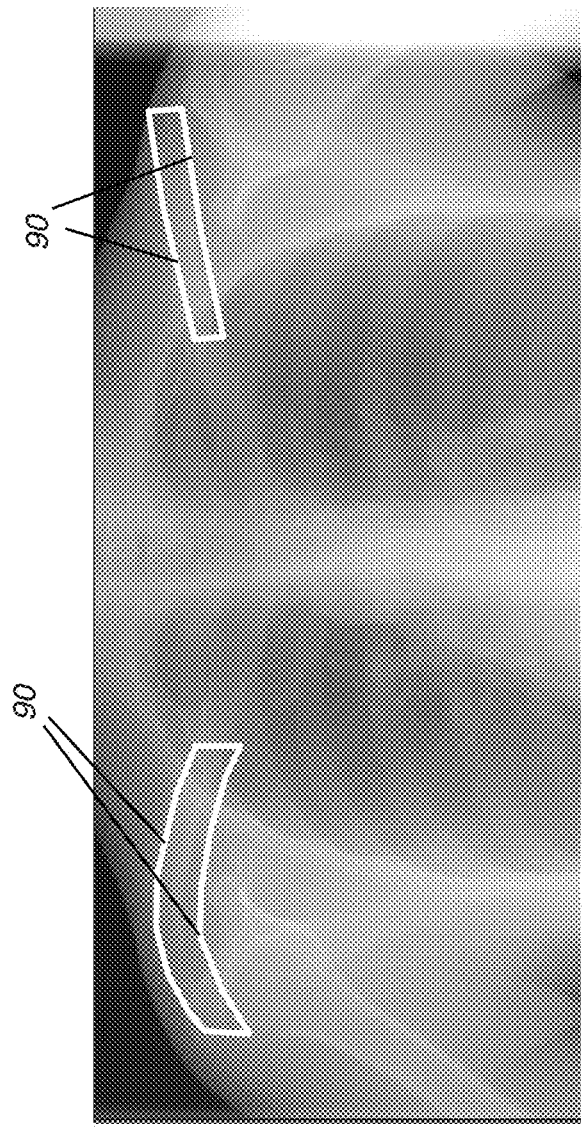
FIG. 10 is a plan view showing upper portions of a chest x-ray during clavicle detection.
Figure 11:
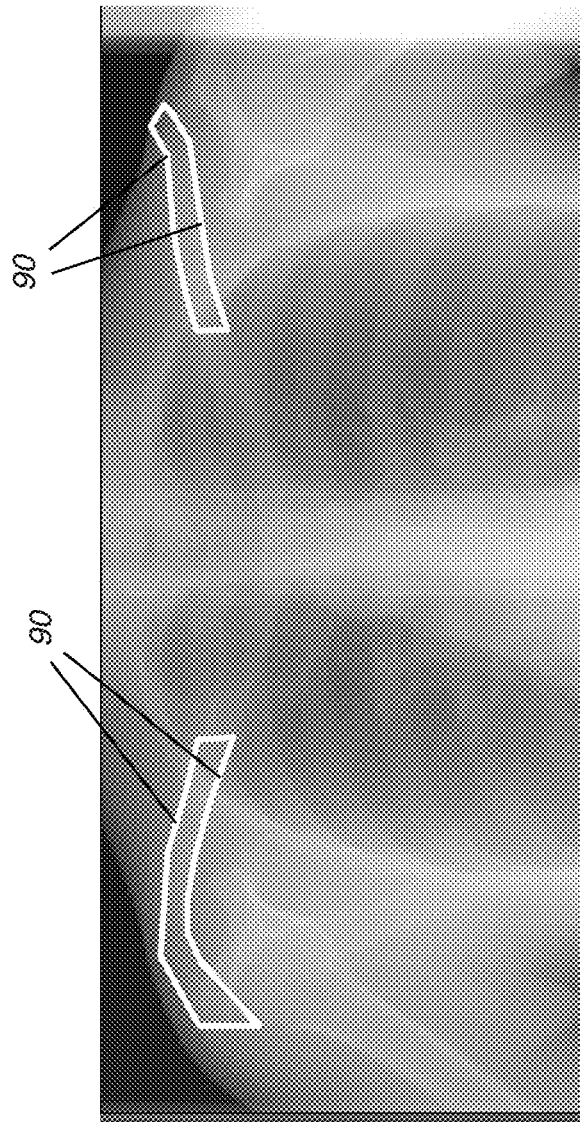
FIG. 11 is a plan view showing upper portions of a chest x-ray during edge refinement.
Figure 12:
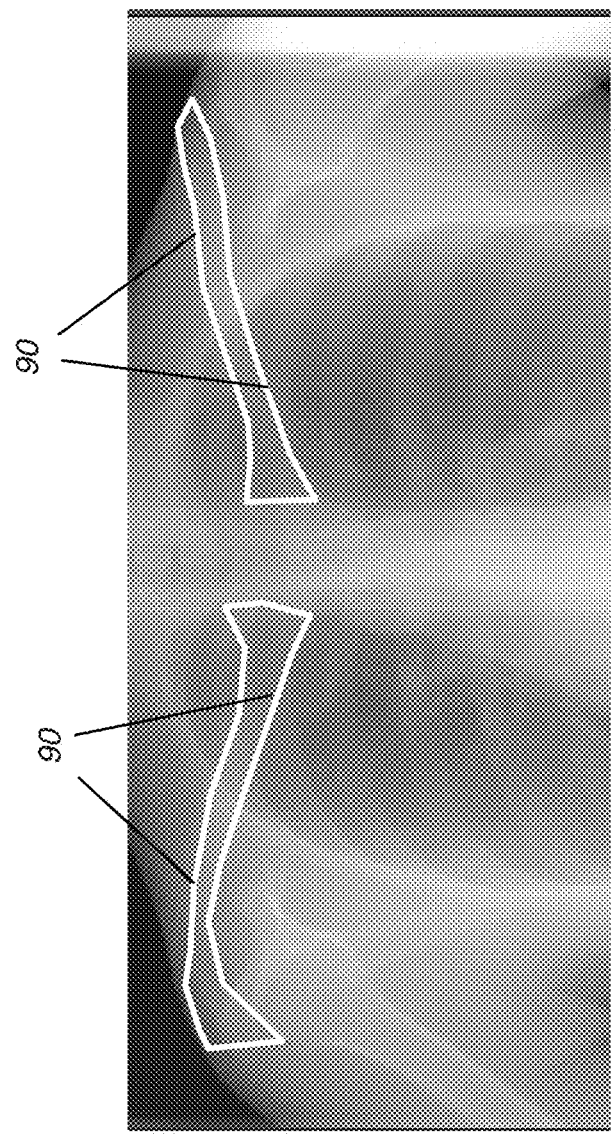
FIG. 12 is a plan view showing upper portions of a chest x-ray following growth routines.
Figure 13:
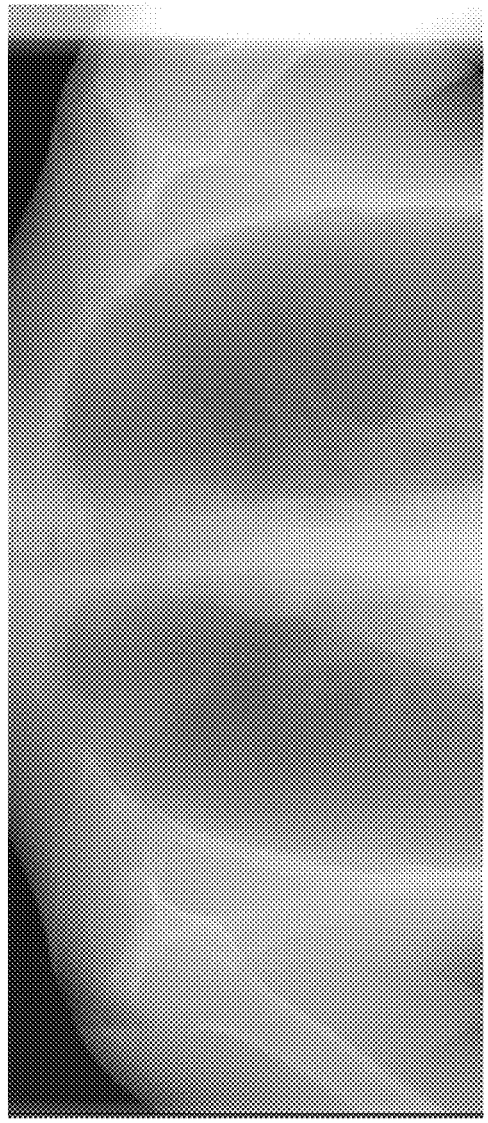
FIG. 13 is a plan view showing upper portions of a chest x-ray after clavicle suppression.

FIG. 10 is a plan view showing upper portions of a chest x-ray during clavicle detection. Initial edge detection defines clavicle edges 90 as shown, outside the lung fields. FIG. 11 shows edge refinement during clavicle detection, more closely approximating the clavicle edges 90, but still lying primarily outside the lung field. FIG. 12 shows the clavicle edges 90 following growth routines in a growth step (FIG. 1). FIG. 13 shows results for image conditioning following a clavicle suppression step 70 (FIG. 1), displaying the clavicle-suppressed image at the conclusion of this process.

Consistent with an embodiment of the present invention, a computer program utilizes stored instructions that perform on image data that is accessed from an electronic memory. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including an arrangement of networked processors, for example. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the art will further readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method for processing a chest x-ray image, executed at least in part by a computer, comprising:
   identifying lung fields in the x-ray image;
   detecting at least one portion of a clavicle that lies outside the lung fields by: (i) generating one or more gradient feature images, (ii) applying a gradient analysis to the one or more gradient feature images to detect a set of candidate portions, wherein the gradient analysis includes an assessment of at least one of the following: gradient strength, gradient length, gradient angle, gradient intensity, and symmetry factors, and (iii) applying a false-positive analysis to the set of candidate portions;
   detecting a clavicle ridge based on the detected clavicle portion;
   detecting clavicle edges of the detected clavicle portion;
   guided by the clavicle ridge, extending edge detection for the clavicle edges into the lung fields to detect clavicle line segments within the lung fields;
   defining the clavicle within the x-ray image according to the edge detection;
   suppressing the clavicle within the x-ray image to generate a clavicle-suppressed x-ray image; and
   displaying, storing, or transmitting the clavicle-suppressed x-ray image.

2. The method of claim 1 wherein detecting the at least one portion of the clavicle comprises applying a derivative analysis filter.

3. The method of claim 2 wherein applying a derivative analysis filter includes using a Laplacian filter.

4. The method of claim 1 wherein detecting the at least one portion of the clavicle comprises applying results from trained system processing.

5. The method of claim 1 further comprising refining the edges.

6. The method of claim 1 further comprising generating and applying an artifact mask.

7. The method of claim 1 wherein detecting the at least one portion of the clavicle further comprises identifying and removing false positives.

8. The method of claim 1 wherein detecting edges of the clavicle further comprises checking symmetry.

9. A method for processing a chest x-ray image, executed at least in part by a computer, comprising:
   identifying a region of interest that includes lung fields in the chest x-ray image;
   detecting at least one portion of a clavicle that lies within the region of interest and outside the lung fields by: (i) generating one or more gradient feature images, (ii) applying a gradient analysis to the one or more gradient feature images to detect a set of candidate portions, wherein the gradient analysis includes an assessment of at least one of the following: gradient strength, gradient length, gradient angle, gradient intensity, and symmetry factors, and (iii) applying a false-positive analysis to the set of candidate portions;
   detecting a clavicle ridge based on the detected clavicle portion;
   forming a clavicle mask that includes the at least one portion of the detected clavicle;
   detecting and refining edges of the detected at least one portion of the clavicle, wherein the edges lie within the clavicle mask;
   guided by the detected clavicle ridge, extending edge detection for the detected clavicle edges into the lung fields and refining the clavicle mask to include edges that lie within the lung fields;
   suppressing the clavicle within the clavicle mask to generate a clavicle-suppressed x-ray image; and
   displaying, storing, or transmitting the clavicle-suppressed x-ray image.

10. The method of claim 9 wherein detecting the at least one portion of the clavicle comprises applying a trained system to classify pixels in the region of interest as clavicle or non-clavicle.

11. The method of claim 9 further comprising generating and applying an artifact mask over an area of the chest x-ray image that includes tubing or wire.

12. The method of claim 9 wherein refining the clavicle mask further comprises analyzing at least one of gradient strength, gradient length, or gradient angle for the edges that lie within the lung fields.

13. The method of claim 9 wherein detecting edges of the at least one portion of the clavicle further comprises identifying and removing false positives.

14. A method for processing a chest x-ray image, executed at least in part by a computer, comprising:
   segmenting lung fields in the x-ray image;
   generating and refining a clavicle search mask according to the segmented lung fields, wherein the clavicle search mask includes a portion of the image lying outside the segmented lung fields;
   applying gradient analysis to portions of the image corresponding to the generated clavicle search mask and identifying a clavicle ridge and one or more clavicle edges that lie within the clavicle search mask and outside the lung fields;
   guided by the clavicle ridge, extending the one or more identified clavicle edges into the lung fields and identifying one or both clavicles;
   suppressing the one or both clavicles within the chest x-ray image to generate a clavicle-suppressed x-ray image; and
   displaying, storing, or transmitting the clavicle-suppressed x-ray image.

15. The method of claim 14 wherein the step of applying gradient analysis includes using a Laplacian filter.

\* \* \* \* \*